United States Patent Office 3,405,116
Patented Oct. 8, 1968

3,405,116
PROCESS FOR THE PRODUCTION OF AZO
COMPOUNDS
Hans Ischer, Basel, Switzerland, assignor to Sandoz Ltd.
(also known as Sandoz A.G.), Basel Switzerland
No Drawing. Filed Sept. 10, 1965, Ser. No. 486,563
Claims priority, application Switzerland, Sept. 15, 1964,
11,957/64
13 Claims. (Cl. 260—145)

ABSTRACT OF THE DISCLOSURE

The production of azo compounds by coupling diazotized amines with coupling components is accelerated by amino sulfonic acids, guanidines, biguanides, guanylureas and salts thereof.

---

The production of azo compounds by coupling diazotised amines with coupling components is often carried out in the presence of coupling accelerators. The known coupling accelerators which are most frequently used and which have versatile uses, especially for coupling reactions in alkaline medium, are pyridine and its derivatives. However, the odour emitted by these is a serious inconvenience. Pyridine bases can in fact have a deleterious effect on health, and for this reason they must be carefully eliminated from the final products.

It has now been found that in the production of azo compounds accomplished by coupling compounds having at least one diazo group with coupling components, these disadvantages can be obviated by carrying out the coupling reaction in the presence of compounds of formula

(I)

wherein:

A represents $SO_2$,

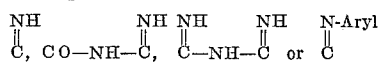

$R_1$ represents OH, when A stands for $SO_2$; or

when A has one of the other aforestated meanings,
$R_2$, $R_3$ and $R_4$ represent hydrogen or aryl, and
$R_5$ represents hydrogen or aryl, or when $R_2$, $R_3$ and $R_4$ stand for hydrogen, also

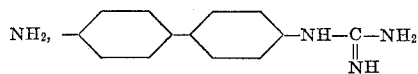

or

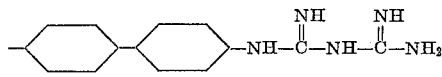

or in the presence of salts or mixtures of these compounds with each other or with urea.

Examples of suitable compounds of Formula I are aminosulfonic acid, its sodium, potassium or ammonium salts, guanidine, guanyl-urea, monophenyl-guanidine, monotolyl-guanidine, symmetrical or asymmetrical diphenyl- or ditolyl-guanidines, triphenyl- or tritolyl-guanidines, diphenyl-diguanidines, biguanide, mono- and di-phenyl-biguanides, diphenyl-dibiguanide, phenylated diphenyl-dibiguanides, amino-guanidine, and the salts of the inorganic or organic acids of the aforenamed compounds, such as their chlorides, carbonates, sulfates, phosphates, acetates, palmitates, stearates, oleates or phthalates, or mixtures of the aforenamed compounds with each other or with urea. With the compounds of Formula I aminohydroxynaphthalenesulfonic acids, e.g. 2-amino-5-hydroxynaphthalene-7-sulfonic acid, which is capable of coupling in the ortho position relative to the hydroxyl group and in the ortho position relative to the amino group, can be coupled uniformly in ortho position to the amino group with diazo compounds of low coupling energy, for example with diazotised 1-amino-2-hydroxynaphthalene-4-sulfonic acid, in strongly mineral acid solution. The alkaline coupling reaction is similarly accelerated by the addition of compounds of Formula I. Hitherto, alkaline coupling of diazo and diazoazo compounds derived from 1-amino-2-alkoxynaphthalene or its sulfonic acids could be effected with acceptable yields only in the presence of pyridine or one of its derivatives.

Besides the accelerating and stabilizing action of the compounds of Formula I on the diazo compounds, the former have the advantage that they very often develop their effectiveness already when employed in small amounts, e.g. equivalent amounts. In the numerous cases in which azo dyes capable of being coppered are in production, the coppering reaction can be performed in the coupling mixture containing the compound of Formula I. With such a procedure these compounds give particularly good results when the coppering reaction has to be carried out with cleavage of alkoxy groups. The rate of the coppering reaction is thereby appreciably accelerated so that welcome economies in power consumption can be realized. The aforementioned advantages of the new process are in many instances yet further enhanced by the excellent dispersing and solubilizing properties of many of the named compounds, particularly when the salts of their fatty acids are used.

The compounds of Formula I can be applied in various ways. For instance, they can be dissolved or pasted with the coupling component in a little water and the solution or paste combined with the diazonium salt at temperatures of 0° to 85° C., if necessary in the presence of organic or inorganic acids or organic or inorganic bases, or initially mixed with the diazonium salt. In certain cases the additional use of other dissolving intermediates, such as glycols or their ethers, e.g. ethylene glycol, propylene glycol, diethylene glycol or 2-ethoxy-ethanol, or of stabilizers for the diazo compound, e.g. naphthalenesulfonic acids, can be of special advantage. A number of the compounds of Formula I, for instance the biguanides, form sparingly soluble salts with azo dyes. On completion of the coupling reaction these dye salts are split off by the action of mineral acids, upon which the accelerator is recovered from the acid filtrate by rendering the latter alkaline.

The resulting azo dyes or their metal complex compounds, e.g. copper, nickel, cobalt or chromium complex compounds, are precipitated in a known manner, e.g. by salting out, if necessary after previous neutralization of the solution or suspension, and are then filtered off with suction, washed if necessary and dried.

In the following examples the parts and percentages are by weight and the temperatures in degrees centigrade.

EXAMPLE 1

60.8 parts of the monoazo compound obtained by coupling diazotised 2-amino-4-chloro-1,1'-diphenyl ether with 1 - amino - 3 - (4'-methyl)-phenylsulfonylaminobenzene-6-sulfonic acid in weakly alkaline solution are dissolved in 1000 parts of hot water, and after the addition of 11 parts of sodium nitrite the solution is made strongly mineral acid at 0° with 85 parts of 30% hydrochloric acid. After stirring for four hours diazotisation is complete. The orange-brown diazo compound is salted out, filtered off, and stirred in a little water at 0° to form a slurry, to which is added rapidly a suspension of 26.3 parts of 2-amino-8-hydroxynaphthalene-6-sulfonic acid and 250 parts of guanyl-urea sulphate in 100 parts of water. The mixture is heated to 35°. Coupling in ortho position to the amino group of the 2-amino-8-hydroxynaphthalene-6-sulfonic acid takes place rapidly and a deep blue solution of the newly formed disazo dye is obtained. This is neutralised with sodium carbonate, heated to 90°, and the dye is then salted out, filtered off and vacuum dried at 90°.

EXAMPLE 2

The normal diazotisation reaction is performed with 44.5 parts of the monoazo dye obtained by alkaline coupling of diazotised 2-amino-6-chloro-1-hydroxybenzene-4-sulfonic acid and 1-(4'-amino)-phenyl-3-methyl-5-pyrazolone. The precipitated diazo compound is filtered off with suction. 28 parts of 2-amino-5-hydroxynaphthalene-7-sulfonic acid are stirred in a mixture of 150 parts of water, 400 parts of guanyl-urea chloride and 15 parts of 30% hydrochloric acid, heated to 70-75°, and at this temperature it is added with stirring over the next two hours to the moist diazo compound. The coupling reaction takes place rapidly and uniformly in ortho position to the amino group of the 2-amino-5-hydroxynaphthalene-7-sulfonic acid, the greater part of the brown-red disazo dye thus formed going into solution. The dissolved dye is precipitated by the addition of 900 parts of methyl alcohol and 100 parts of 30% hydrochloric acid, filtered off and dried.

EXAMPLE 3

59.7 parts of the disazo compound (in the form of the free acid), which is obtained by tetrazotisation of 1 mole of 4,4'-diamino-1,1'-diphenyl and coupling of the tetrazo compound with 1 mole of 1-hydroxybenzene-2-carboxylic acid and 1 mole of 1-amino-2-methoxynaphthalene-6-sulfonic acid, are stirred into 600 parts of water and diazotised by the addition of 7 parts of sodium nitrite and 60 parts of 30% hydrochloric acid. The diazonium salt, which is precipitated in the form of brown crystals, is filtered off. At this point 250 parts of aminosulfonic acid and 216 parts of sodium hydrogen carbonate are dissolved in 250 parts of water, to which 40 parts of anhydrous sodium carbonate and 30.4 parts of 1-hydroxynaphthalene-3,6-disulfonic acid are added. The diazonium compound is run into this solution at 5–10°. The coupling reaction takes place rapidly to give an olive green dye which goes into solution for the greater part. After continued stirring for 12 hours the coupling mixture is heated to 90–95° and to it is added a solution of 25 parts of copper sulfate in 50 parts of water and 10 parts of 25% ammonia. Stirring is continued for a further four hours at 90–95°, during which time the copper complex of the trisazo dye is formed. Subsequently the solution is diluted with an equal volume of water, the copperised dye salted out, filtered off and dried. It dyes cotton and fibres of regenerated cellulose in olive green shades which are fast to light and washing. When the 30.4 parts of 1-hydroxy-naphthalene-3,6-disulfonic acid used in the foregoing example are replaced by an equivalent amount of 1-hydroxynaphthalene-4- or -5-sulfonic acid, 2-hydroxynaphthalene-4- or -6-sulfonic acid, 2-hydroxynaphthalene-3,6-disulfonic acid or 1-hydroxynaphthalene-3,6,8-trisulfonic acid, other valuable copper-containing trisazo dyes of olive green shade are obtained.

Without the addition of aminosulfonic acid virtually no coupling occurs. The sodium salts can be replaced as acid-binding agents by the corresponding potassium salts or by ammonia without detriment to the yield or the quality of the dye.

EXAMPLE 4

In 600 parts of hot water 61.9 parts of the disazo dye of formula

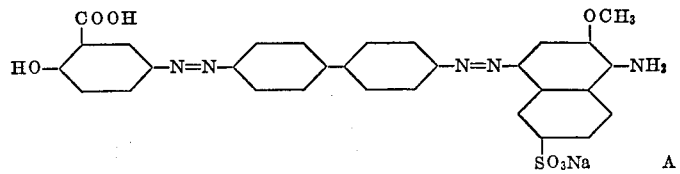

A are dissolved with the addition of 6 parts of anhydrous sodium carbonate. 7 parts of sodium nitrite are added to the solution, which is then cooled to 8°, on which 70 parts of 30% hydrochloric acid are added. The reaction mixture is stirred for two hours at 5–10°, after which the brown diazo compound formed is precipitated. The small excess of nitrous acid is decomposed by adding a little aminosulfonic acid. The diazo compound is filtered off and combined at 0° with a solution prepared by heating 19.5 parts of monophenylguanidine carbonate, 200 parts of water and 14 parts of 30% hydrochloric acid at 90–100%. To the combined solution is added a suspension, cooled to 20°, of 31 parts of 1-hydroxynaphthalene-3,6-disulfonic acid, 60 parts of anhydrous sodium carbonate and 22 parts of monophenylguanidine carbonate in 200 parts of water, previously prepared by heating at 80°. The reaction mixture is heated to 40°, upon which the coupling reaction takes place rapidly with the formation of a green trisazo dye. Coupling is completed by increasing the temperature to 85°, whereupon the greater part of the dye goes into solution. The coupling mixture is allowed to cool to 20° in about 12 hours with stirring, then it is acidified with hydrochloric acid and adjusted to a pH value of about 5 with sodium acetate. The mixture is again heated to 60°, the dissolved dye precipitated with a sodium chloride addition, filtered off and washed three times with ethanol. The still moist dye is converted into its copper complex by heating at 95° with stirring in 1000 parts of water, 40 parts of diethanolamine and an ammonia-alkaline copper sulfate solution containing 25 parts of crystallised copper sulfate, until demethylation and coppering are complete. The copper complex of the trisazo dye is salted out with sodium chloride, filtered off and dried. It is obtained as a dark powder which dissolves in water with an olive-green coloration and dyes cellulosic fibres in olive green shades having very good fastness properties.

Virtually no coupling takes place when monophenylguanidine carbonate is omitted. Equally good results are obtained with equivalent amounts of 2-methylphenyl- or 4-methylphenyl-guanidine.

EXAMPLE 5

61.9 parts of the disazo dye of Formula A are dissolved in 600 parts of hot water with the addition of 13.5 parts of 30% sodium hydroxide solution. 7 parts of sodium nitrite are added to this solution, which is then cooled to 8°. 70 parts of 30% hydrochloric acid are added and the reaction mixture stirred for two hours at 5–10°, upon which the brown diazo compound formed is precipitated. The slight excess of nitrous acid is destroyed by adding a little aminosulfonic acid and the diazo compound is filtered off. For the purpose of coupling, 50 parts of symmetrical diphenyl-dibiguanide are suspended in 300 parts of water and 50 parts of anhydrous sodium carbonate are added to the suspension, followed by 39 parts of 1-hydroxynaphthalene-3,6,8-trisulfonic acid. The mixture is heated to 80°, cooled again to 5–10°, the previously produced diazonium compound added with good stirring and the coupling mixture stirred for a further 12 hours at 20–25°. It is then adjusted to a weakly mineral acid reaction with 30% hydrochloric acid and, heated to 60°. After cooling to 30–40°, the precipitated dye is filtered off, washed with water, and dissolved with stirring in 300 parts of water and 60 parts of 30% sodium hydroxide solution. The olive green dye is then precipitated by the addition of 300 parts of alcohol and 15 parts of sodium chloride, filtered off and washed with alcohol.

The trisazo dye thus obtained can be demethylated and coppered according to the particulars given in Example 4, and then gives fast olive green dyeings on cellulosic fibres and textile materials of these fibres.

When the symmetrical diphenyl-dibiguanide is replaced by the equivalent amount of symmetrical diphenyl-diguanidine, the trisazo dye is obtained in equally good yield and quality.

EXAMPLE 6

61.9 parts of the disazo dye of Formula A are converted into the diazo compound according to the procedure of Example 4. 31 parts of 1-hydroxynaphthalene-4,6-disulfonic acid and 40 parts of anhydrous sodium carbonate are suspended in 250 parts of water, 150 parts of phenyl-biguanide chloride are added, the whole is heated to 80° and then cooled to 0–10°. Thereupon the diazo compound is added to it in pasted form in several portions and stirring continued for a further 12 hours. The trisazo dye suspension thus formed is neutralized with 15% hydrochloric acid, and 20% of the reaction volume of ethanol is added. The mixture is then heated to 65°, sodium chloride added and the precipitated dye filtered off. It is dissolved in 800 parts of water by the addition of 15 parts of sodium hydroxide and reprecipitated, and subsequently coppered with demethylation in accordance with the details given in Example 4. The resulting copper complex of the trisazo dye gives very fast olive green shades on cotton and other cellulosic fibres.

In place of phenyl-biguanide chloride, 2-methylphenyl-biguanide chloride can be used with equally good success.

EXAMPLE 7

61.9 parts of the disazo dye of Formula A are converted into the diazo compound according to the procedure of Example 4. For the coupling reaction 200 parts of guanidine carbonate are suspended in 250 parts of water, then 40 parts of anhydrous sodium carbonate and 31 parts of 1-hydroxynaphthalene-3,6-disulfonic acid are added. The suspension is heated to 80° and then cooled to 5–10°. The diazo compound is added to it in paste form, upon which coupling takes place immediately. Stirring is continued for 12 hours, after which 20 parts of 30% sodium hydroxide solution are added; the dye is precipitated with ethanol, filtered off and washed with dilute alcohol. The filter residue is stirred in 1000 parts of water, the mixture made acid to Congo red paper with dilute hydrochloric acid, and then adjusted to a pH value of 4 with sodium acetate. It is heated to 60°, the product salted out with sodium chloride and filtered off. After demethylating coppering has been carried out in accordance with the particulars of Example 4, a dye is obtained which corresponds to that of Example 4.

In place of guanidine carbonate, an equivalent amount of another water-soluble guanidine salt can be used with equally good success, e.g. guanidine chloride, in which case it is advisable to increase the sodium carbonate addition to 50 parts.

Aminoguanidine and biguanide in the form of free bases or water-soluble salts, e.g. aminoguanidine hydrogencarbonate, chloride or sulfate, biguanide mono- or dichloride, exercise the same beneficial effect on the coupling action as guanidine carbonate or guanidine chloride.

EXAMPLE 8

The diazo compound of 50.3 parts of the monoazo dye which is obtained by diazotisation of dehydrothiotoluidine-monosulfonic acid and subsequent coupling in acid medium with 1-amino-2-ethoxynaphthalene, are pasted in the moist state with 200 parts of water, and 100 parts of N,N'-diphenylguanidine are added to the paste. This mixture is added slowly at 20–25° to a mixture of 40 parts of the potassium salt of 1-acetylamino-8-hydroxynaphthalene-3,6-disulfonic acid, 300 parts of water and 300 parts of acetone. Coupling takes place instantaneously, upon which the disazo dye formed is precipitated. On contact with it Brilliant Yellow indicator paper changes to red. After dilution with 500 parts of water, the product is filtered off, the residue dissolved in 1000 parts of water and 100 parts of 30% sodium hydroxide solution and reprecipitated using small amounts of ethanol and sodium chloride, then filtered off, washed with ethanol and dried in vacuum at 70°.

The disazo dye thus obtained is a dark powder which dissolves in water to give green solutions and dyes cotton and other cellulosic fibres in very bright green shades.

In the same way very good results are obtained when the N,N'-diphenyl-guanidine is replaced by an equivalent amount of N,N-di-(ortho-methylphenyl)-guanidine,
N,N'-di-(ortho-ethylphenyl)-guanidine,
N,N'-di-(para-methyl-phenyl)-guanidine,
N,N'-di-(2',4'-dimethylphenyl)-guanidine,
N,N'-di-(3',4'-di-methylphenyl)-guanidine,
N-phenyl-N'-ortho-methyl-phenyl-guanidine,
N,N'-diphenyl-N''-ortho-methylphenyl-guanidine,
N,N'-di-(ortho-methylphenyl)-N''-phenyl-guanidine or
N,N',N''-triphenyl-guanidine.

EXAMPLE 9

The diazo compound obtained with 61.9 parts of the disazo dye of Formula A according to the particulars of Example 4 is filtered off with suction and entered in paste form into a solution at 0° which has been prepared by heating 22.6 parts of monophenyl-biguanide chloride in 200 parts of water and 5 parts of 30% hydrochloric acid with subsequent cooling to 0°. Afterwards a suspension of 31 parts of 1-hydroxynaphthalene-3,6-disulfonic acid in 200 parts of water at 20° is added, together with 60 parts of anhydrous sodium carbonate. The reaction mixture is stirred at about 20° until it is homogeneous and is then heated to 85°, whereupon the coupling reaction takes place very rapidly, the dye formed going into solution. On completion of coupling the mixture is allowed to cool to 20° in about 12 hours with constant stirring, and is then acidified with concentrated hydrochloric acid and its pH adjusted to about 5 with sodium acetate. The mixture is again heated to 60°, the dissolved dye precipitated at this temperature by the addition of sodium chloride, filtered off and washed with ethanol. The trisazo dye thus obtained is converted into the copper complex compound in the way described in Example 4. The copper-containing dye possesses the same properties as the dye of Example 4.

EXAMPLE 10

27.2 parts of 4,4'-diamino-1,1'-diphenyl-3,3'-dicarboxylic acid are dissolved at 20° in 700 parts of water and 28 parts of 30% sodium hydroxide solution. After the addition of 13.8 parts of sodium nitrite in solution in 50 parts of water, the solution is run in about 30 minutes into a solution of 113 parts of 30% hydrochloric acid, 45 parts of sodium naphthalene-2-sulfonate and 510 parts of ice water maintained at 0–5°. The combined solution is then stirred for 2 hours at 0–5°.

During tetrazotisation 103 parts of the monoazo compound of formula

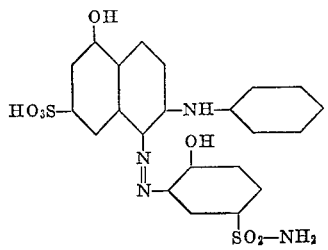

are stirred into 350 parts of water and 200 parts of 25% ammonia, with the subsequent addition of 300 parts of urea and 50 parts of guanidine carbonate. This coupling mixture is cooled to 0–5° and the aforedescribed tetrazo suspension is added to it in 30–40 minutes at 5–10°, upon which the coupling reaction sets in immediately. The pH value is maintained at about 10 by dropwise addition of 15% sodium hydroxide solution. Following the addition of the tetrazo suspension the mixture is stirred for about 16 hours without further cooling. After this time no further tetrazo compound is indicated.

200 parts of sodium hydrogen carbonate are added to the coupling mixture and the temperature increased to 80°. The navy blue dye settles out in a well filterable form and is filtered off, washed with sodium chloride solution, dried and ground. It is obtained in very good yield as a dark powder which is well soluble in water and dyes cotton and regenerated cellulosic fibres in navy blue shades. On aftertreatment with copper salts the dyeings are of very bright shade and are very fast to light, washing and perspiration.

The following amounts of compounds of Formula I— expressed in moles of free base or free acid per mole of diazonium group—were used in the Examples 1 to 10.

| Example: | Moles of compound (I) per mole of diazonium group |
|---|---|
| 1 | 16.6 |
| 2 | 28.8 |
| 3 | 25.8 |
| 4 | 2.38 |
| 5 | 1.42 |
| 6 | 7.05 |
| 7 | 22.2 |
| 8 | 4.75 |
| 9 | 1.05 |
| 10 | 2.78 | or 5.55 moles per mole of tetrazo compound.

According to this invention from 1 to 30 moles of compound (I) are employed per mole of diazonium group.

Having thus disclosed the invention what I claim is:

1. A process for the production of an azo compound comprising coupling a diazo compound with a coupling component in a reaction medium containing an accelerator wherein the accelerator comprises at least one member from the group consisting of (a) a compound of the formula

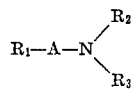

(I)

wherein:
A is a member selected from the group consisting of

and

$R_1$ is OH, ONa, OK or $OHN_4$ when A is —$SO_2$—; $R_1$ is

when A has one of the other aforestated meanings;
each of $R_2$, $R_3$ and $R_4$ is a member selected from the group consisting of hydrogen and aryl; and
$R_5$ is a member selected from the group consisting of hydrogen, aryl and, when each of $R_2$, $R_3$ and $R_4$ is hydrogen, —$NH_2$,

and

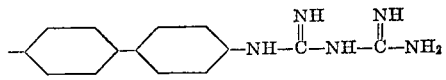

aryl being a member selected from the group consisting of phenyl, methylphenyl, dimethylphenyl, and ethylphenyl; and (b) an acid addition salt of a compound of Formula I with an acid selected from the group consisting of an inorganic acid and a carboxylic acid.

2. A process according to claim 1 wherein said accelerator comprises at least one compound of Formula I.

3. A process according to claim 1 wherein said accelerator comprises a mixture of members selected from (a) and (b).

4. A process according to claim 1 wherein the reaction medium contains urea.

5. A process according to claim 1 wherein $R_1$ is a member selected from the group consisting of ONa, OK and $ONH_4$.

6. A process according to claim 1 wherein said accelerator comprises a member selected from the group consisting of guanidine, aminoguanidine, guanylurea, biguanide, monoarylguanidine, diaryl-guanidine, triaryl-guanidine, diaryl-diguanidine, monaryl-biguanide, diaryl-biguanide, diphenyl-dibiguanide, their carboxylic acid acid addition salts and their inorganic acid addition salts; aryl being a member selected from the group consisting of phenyl, methylphenyl, dimethylphenyl, and ethylphenyl.

7. A process according to claim 1 wherein the reaction medium has a pH ranging from acid to alkaline.

8. A process according to claim 1 wherein said accelerator comprises at least one acid addition salt of a compound of Formula I.

9. A process according to claim 8 wherein the acid addition salt is a member selected from the group consisting of a chloride, a carbonate, a sulfate, a phosphate, an acetate, a palmitate, a stearate, an oleate and a phthalate.

10. A coupling component/diazotized amine reaction medium for the production of azo compounds, which medium contains from 1 to 30 moles of coupling accelerator per mole of diazonium group and wherein the accelerator is a member selected from the group consisting of (a) a compound of the formula

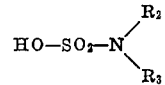

wherein each of $R_2$ and $R_3$ is a member selected from the group consisting of hydrogen and aryl of the benzene series;

(b) a compound of the formula

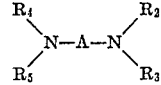

wherein:
each of $R_2$, $R_3$, $R_4$ and $R_5$ is a member selected from the group consisting of hydrogen and aryl of the benzene series; and A is a member selected from the group consisting of

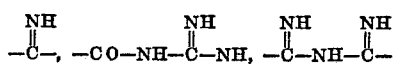

and

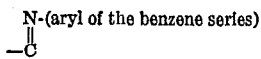

and (c) a compound of the formula $$R_5-NH-A-NH_2$$

wherein:
R$_5$ is a member selected from the group consisting of —NH$_2$,

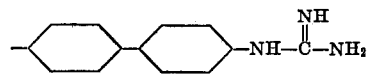

and

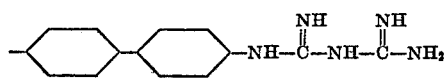

and
A is a member selected from the group consisting of

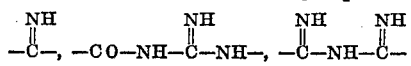

and

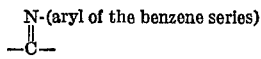

aryl of the benzene series being a member selected from the group consisting of phenyl, methylphenyl, dimethylphenyl and ethylphenyl.

11. A coupling component reaction mixture according to claim 10 containing, as coupling accelerator, a compound of the formula

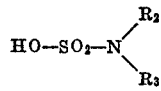

wherein each of R$_2$ and R$_3$ is a member selected from the group consisting of hydrogen and aryl of the benzene series.

12. A coupling component reaction mixture according to claim 10 containing, as coupling accelerator, the improvement wherein the coupling accelerator is a compound of the formula

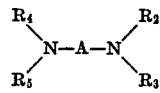

wherein:
each of R$_2$, R$_3$, R$_4$ and R$_5$ is a member selected from the group consisting of hydrogen and aryl of the benzene series; and
A is a member selected from the group consisting of

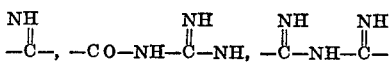

and

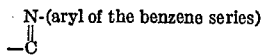

13. A coupling component reaction mixture according to claim 10 containing, as coupling accelerator, the improvement wherein the coupling accelerator is a compound of the formula $$R_5-NH-A-NH_2$$

wherein:
R$_5$ is a member selected from the group consisting of —NH$_2$,

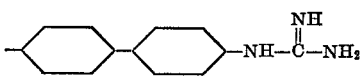

and

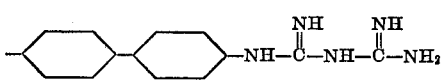

and
A is a member selected from the group consisting of

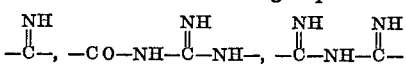

and

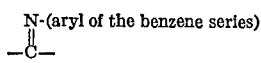

References Cited

UNITED STATES PATENTS

| | | | |
|---|---|---|---|
| 2,891,047 | 6/1959 | Suckfull et al. | 260—194 XR |
| 3,211,717 | 10/1965 | Thomas | 260—207 XR |
| 3,278,516 | 10/1966 | Scherer et al. | 260—163 |

OTHER REFERENCES

Houben-Weyl: "Methoden Der Organischen Chemie," volume 10/3, p. 265 (1965).

FLOYD D. HIGEL, *Primary Examiner.*

UNITED STATES PATENT OFFICE
CERTIFICATE OF CORRECTION

Patent No. 3,405,116                            October 8, 1968

Hans Ischer

It is certified that error appears in the above identified patent and that said Letters Patent are hereby corrected as shown below:

Column 5, line 30, "pasted" should read -- paste --. Column 8, line 1, "OHN$_4$" should read -- ONH$_4$ --; line 41, "inorganic acid addition salts;" should read -- inorganic acid acid addition salts; --. Column 9, lines 46 and 47, and column 10, lines 14 and 15, cancel "the improvement wherein the coupling accelerator is", each occurrence.

Signed and sealed this 10th day of March 1970.

(SEAL)
Attest:

Edward M. Fletcher, Jr.                      WILLIAM E. SCHUYLER, JR.
Attesting Officer                               Commissioner of Patents